United States Patent
Lasecki et al.

(10) Patent No.: US 6,721,479 B2
(45) Date of Patent: Apr. 13, 2004

(54) FIBER COLLIMATOR

(75) Inventors: Steve Lasecki, Leominster, MA (US); David Kindler, Concord, MA (US); John S. Berg, Franklin, MA (US); Hae-Kwon Chung, Boston, MA (US); Dave Volfson, Worcester, MA (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/053,225

(22) Filed: Nov. 2, 2001

(65) Prior Publication Data

US 2002/0154865 A1 Oct. 24, 2002

Related U.S. Application Data (60) Provisional application No. 60/273,865, filed on Mar. 7, 2001, and provisional application No. 60/276,712, filed on Mar. 16, 2001.

(51) Int. Cl.[7] .............................. G02B 6/26; G02B 6/32; G02B 6/00
(52) U.S. Cl. .............................. 385/52; 385/33; 385/137
(58) Field of Search .............................. 385/33, 35, 52, 385/65, 83, 88, 89

(56) References Cited

U.S. PATENT DOCUMENTS

| | | | |
|---|---|---|---|
| 5,179,609 A | 1/1993 | Blonder et al. | 385/89 |
| 5,257,332 A | 10/1993 | Pimpinella | 385/59 |
| 5,550,088 A * | 8/1996 | Dautartas et al. | 216/2 |
| 5,574,811 A | 11/1996 | Bricheno et al. | 385/52 |
| 5,613,024 A * | 3/1997 | Shahid | 385/52 |
| 5,857,047 A | 1/1999 | Strand et al. | 385/88 |
| 5,871,559 A | 2/1999 | Bloom | 65/501 |
| 6,003,341 A | 12/1999 | Bloom | 65/484 |
| 6,064,781 A | 5/2000 | Seibold et al. | 385/14 |
| 6,118,917 A | 9/2000 | Lee et al. | 385/49 |
| 6,136,411 A | 10/2000 | Dautartas | 428/141 |
| 2001/0041026 A1 | 11/2001 | Steinberg et al. | 385/20 |
| 2002/0028037 A1 * | 3/2002 | Steinberg et al. | 385/20 |
| 2002/0114566 A1 * | 8/2002 | Fairchild et al. | 385/33 |
| 2002/0181854 A1 * | 12/2002 | Steinberg et al. | 385/20 |
| 2002/0196998 A1 * | 12/2002 | Steinberg et al. | 385/14 |

OTHER PUBLICATIONS

"Single Fiber Collimator" www.casix.com/fibert/fibert008–1.html.

S. Kaneko et al. "Novel Fiber Alignment Method Using a Partially Metal–Coated Fiber in a Silicon V–Groove", IEEE Photonics Technology Letters, vol., 12 No. 6, Jun. 2000.

* cited by examiner

*Primary Examiner*—John D. Lee
*Assistant Examiner*—Sarah U Song
(74) *Attorney, Agent, or Firm*—Fish & Richardson P.C.

(57) ABSTRACT

An apparatus which holds an optical fiber in alignment to an optical device includes a fiber holder having a first plurality of indentations, an optical fiber held within one of the first plurality of indentations, a base substrate having a second plurality of indentations formed in a top surface of the base, a plurality of spacers, each of the plurality of spacers held within one of the second plurality of indentations and an optical device mounted on the base. The fiber holder is mounted on the base with the plurality of spacers within the first plurality of indentations.

14 Claims, 14 Drawing Sheets

FIBER COLLIMATOR

This application claims priority under 35 USC §119(e) to U.S. patent application Ser. No. 60/273,865, filed on Mar. 7, 2001, the entire contents of which are hereby incorporated by reference.

This application also claims priority under 35 USC §119(e) to U.S. patent application Ser. No. 60/276,712, filed on Mar. 16, 2001, the entire contents of which are hereby incorporated by reference.

TECHNICAL FIELD

This invention relates to aligning an optical fiber to a collimating lens.

BACKGROUND

Fiber optic systems often require aligning an optical fiber ("a fiber") to couple light to an optical device, such as a lens or a sensor. The amount of light coupled is a function of the tolerance with which the fiber can be aligned to the optical device. Alignment stations are available which provide a method to 'actively align' a fiber to an optical device. In this case, active alignment involves using actuators to physically move the optical device into alignment with the fiber based on optimizing a measured output signal from the optical device. Alignment stations are generally quite expensive and the alignment accuracy is highly dependent upon the skill of the individual operator. By comparison, passive alignment is defined as aligning a fiber to an optical device automatically, that is, according to the structure or shape of the members holding the fiber and the optical device.

SUMMARY

According to an aspect of this invention an apparatus which holds an optical fiber in alignment to an optical device, the apparatus includes a fiber holder having a first plurality of indentations formed therein, an optical fiber within one of the first plurality of indentations, a base substrate having a second plurality of indentations formed into the base, a plurality of spacers, each of the plurality of spacers within a corresponding one of the second plurality of indentations, wherein the fiber holder is mounted on the base with the plurality of spacers within the first plurality of indentations, and an optical device mounted to the base.

One or more of the following features may also be included, wherein the optical device is a lens, wherein the first plurality of indentations includes an elongated groove, and wherein the optical fiber is held within the elongated groove, wherein the second plurality of indentations includes at least one trapezoidal-shaped pocket, wherein the second plurality of indentations includes an elongated groove, and wherein the optical device includes a lens mounted to the base within the elongated groove, wherein at least one of the plurality of spacers are spherically-shaped, wherein at least one of the plurality of spacers and the optical device are made of the same material, wherein the first plurality of indentations includes at least one trapezoidal-shaped pocket, wherein the second plurality of indentations includes at least one trapezoidal-shaped pocket, a single spacer mounted within one of the second plurality of indentations, wherein the fiber holder is mounted to the base in contact with the single spacer at an end of the fiber holder and establishes a horizontal position of the fiber holder, wherein one of the second plurality of indentations is formed to a different depth than a second of the second plurality of indentations, wherein the base further includes a third plurality of indentations formed in the base, and a second plurality of spacers, each of the second plurality of spacers within a corresponding one of the third plurality of indentations, wherein the optical device is mounted to the base in contact with at least two of the second plurality of spacers and establishes a horizontal position of the optical device, wherein the optical device has a round central section, wherein the optical device includes one of a dome-shaped lens and a disk-shaped lens, wherein the base further includes a third plurality of indentations formed in the base, and a second plurality of spacers, each of the second plurality of spacers within a corresponding one of the third plurality of indentations, wherein the optical device is mounted to the base in contact with at least three of the second plurality of spacers and establishes a vertical position of the optical device, wherein the optical device has at least one flat face, wherein the optical device includes one of a dome-shaped lens and a disk-shaped lens, wherein the second plurality of indentations formed in the base includes at least one indentation located adjacent to an edge of the base, and wherein one of the plurality of spacers held within the one indentation adjacent to the edge of the base protrudes beyond the edge of the base and establishes a known distance from a contact point on the spacer to a point on the base, wherein the one indentation adjacent to the edge of the base is a trapezoidal-shaped pocket, and wherein the one of the plurality of spacers held within the one indentation adjacent to the edge of the base contacts an interior wall of the trapezoidal-shaped pocket.

According to a further aspect of this invention an apparatus which holds a plurality of optical fibers in alignment to a plurality of optical devices, the apparatus includes a fiber holder having a first plurality of indentations formed therein, a plurality of optical fibers, each of the plurality of fibers within a corresponding one of the first plurality of indentations, a base substrate having a second plurality of indentations formed into the base, a plurality of spacers, each of the plurality of spacers within a corresponding one of the second plurality of indentations, wherein the fiber holder is mounted on the base with the plurality of spacers within the first plurality of indentations, and a plurality of optical devices mounted to an end of the fiber holder wherein each of the plurality of optical devices are aligned with a one of the plurality of optical fibers.

One or more of the following features may also be included, wherein at least one of the plurality of optical devices includes a lens.

According to a further aspect of this invention, a method of aligning optical devices includes mounting a first optical device on a first base having a partial indentation formed in an edge of the first base that holds a spacer to protrude beyond the edge of the first base and establishes a known distance from a point on the spacer to the first optical device, mounting a second optical device on a second base, and aligning the second optical device to the first optical device by placing the second base to contact the spacer held in the first base.

Embodiments of the alignment apparatus may have one or more of the following advantages. The apparatus enables an operator or user to passively align a fiber to a collimating lens and, if desired, it can be designed to precisely set the angle between the fiber and the lens so as to avoid back reflection of a transmitted light beam. The apparatus also enables an accurate determination of the distance from a spacer mounted on the side or end of the apparatus to an optical device, or the fiber, mounted on the apparatus.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
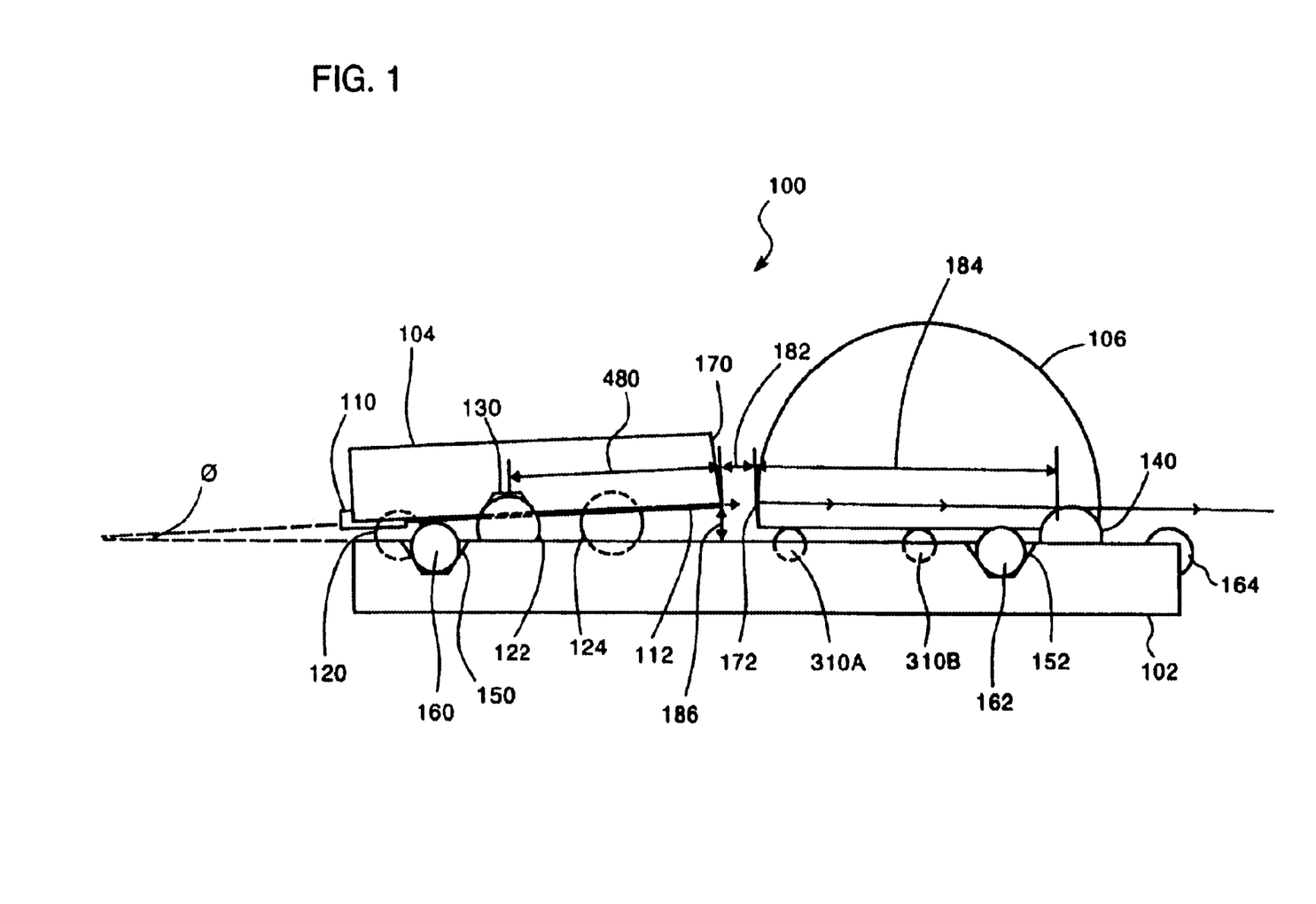
FIG. 1 shows a side view a first embodiment of a fiber to optical device alignment apparatus.
Figure 2:
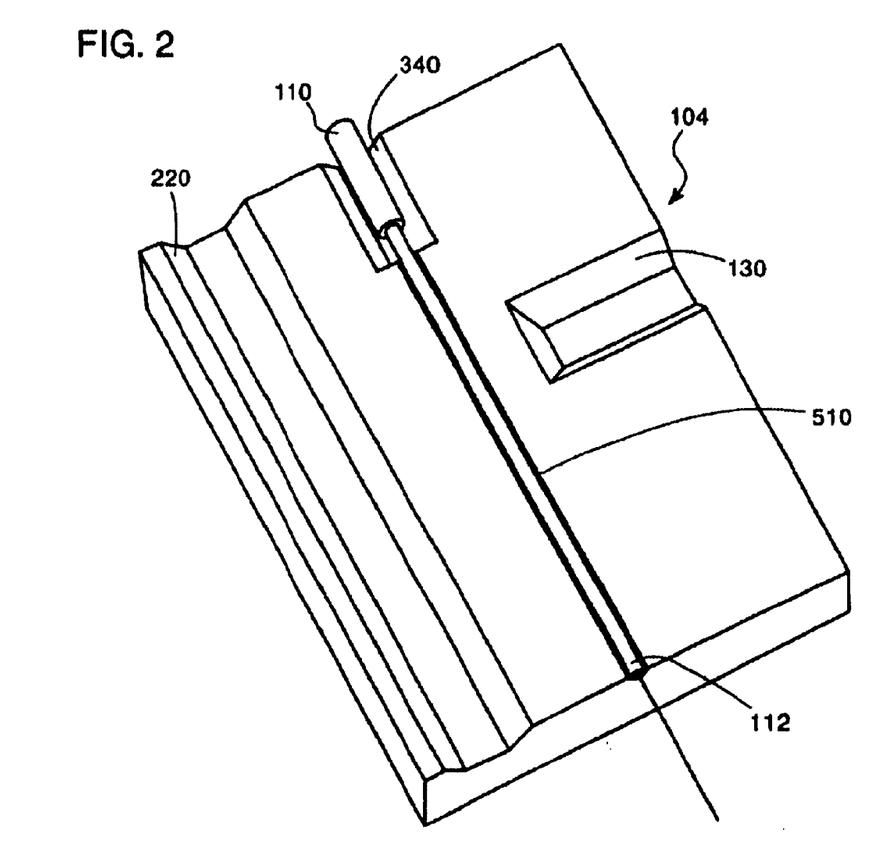
FIG. 2 shows a fiber holder of the first embodiment.
Figure 3:
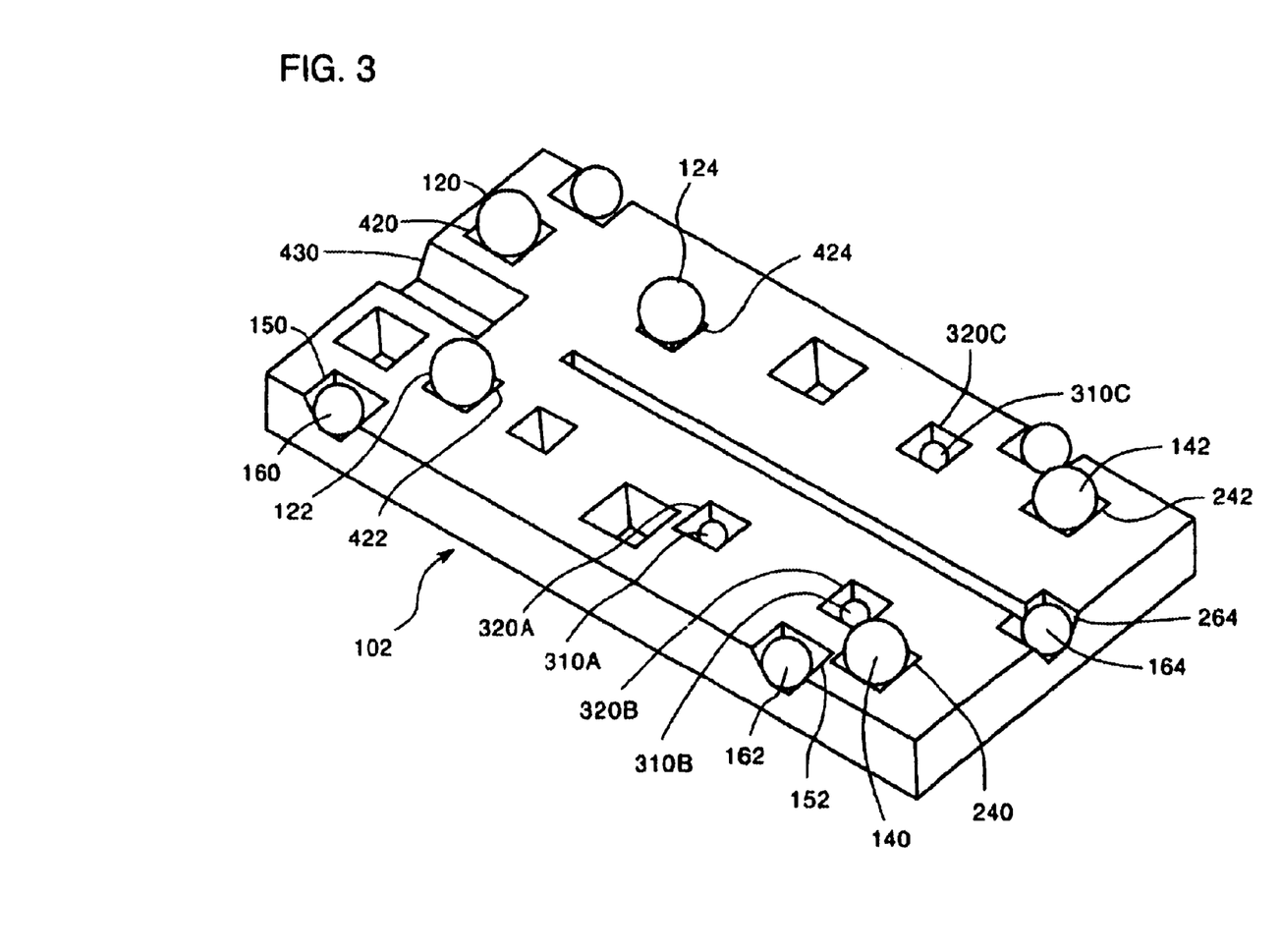
FIG. 3 shows a view of the base of the first embodiment.

Referring to FIGS. 1–3, an apparatus 100 to passively align a fiber 112 to a collimating lens 106 includes fiber holder 104 mounted to a top surface of a base 102. Fiber 112 and lens 106 are passively aligned with each other by corresponding alignment features in fiber holder 104 and in base 102. The passive alignment features include a set of pockets 420, 422 and 424, formed in base 102 (see FIG. 3) and corresponding grooves 130 and 220, formed in fiber holder 104 (see FIG. 2). Fiber holder 104 also includes a large groove 340 and a smaller groove 510 aligned with and extending beyond groove 340 (see FIG. 2). A fiber cable 110 and fiber 112 (a "fiber core") are held by epoxy in grooves 340 and 510, respectively.

To assemble the apparatus 100, spacer balls 120, 122, and 124 are placed, respectively, in pockets 420, 422, and 424 of base 102 and then fiber holder 104 is placed above base 102 so that balls 120 and 124 fit within groove 220 and ball 122 fits within groove 130. Grooves 130 and 220 of fiber holder 104 are formed at right angles to each other. Therefore, when grooves 130 and 220 contact spacer balls 120, 122 and 124, the horizontal movement of fiber holder 104 relative to base 102 is constrained in both the x-direction and the y-direction. This horizontal constraint provides a passive alignment of the fiber 112 to the horizontal center of collimating lens 106, as will be explained. To hold the apparatus 100 together permanently, epoxy (not shown) is put on the balls so that they will be secured within their respective grooves or pockets when the glue sets.

In the described embodiment, fiber holder 104 is mounted at an angle θ relative to base 102 so that fiber 112 is also angled relative to the corresponding surface of collimating lens 106. That is, fiber 112 is angled off from the perpendicular to the corresponding surface of lens 106 so that any light that might be reflected back off that surface will not re-enter the fiber. The angled orientation is achieved by using balls 120, 122 and 124 all having the same diameter and by forming pockets 420, 422 and 424 of varying depths. More specifically, the set of pockets 420, 422 and 424 varies in depth with pocket 420 being the deepest to pocket 424 being the most shallow. By adjusting the depths appropriately, fiber holder 104 can be made to tilt from back to front at the desired angle θ in the z-direction.

In the described embodiment angle θ is 3.64 degrees. However, other angles can be achieved by varying one or more of the depth of pockets 420, 422 and 424, the size of balls 120, 122 and 124 and the depth of groove 220 and 130, so long as balls 120 and 124 fit within, and make contact with, groove 220 and ball 122 fits within, and makes contact with, groove 130 when fiber holder 104 is assembled to base 102.

Fiber holder end 170 and the end of fiber 112 are lapped back at an angle relative to the top and bottom surfaces of fiber holder 104. This lap back angle achieves a reduction in possible back reflection from end of fiber 112 of a light beam leaving the fiber. In the described embodiment, lap back angle is 8 degrees. However, other appropriate lap back angles could be used.

As indicated in FIG. 1, the position of fiber holder 104 can be characterized in part by a forward length 480 and a z-axis distance 186. The forward length 480 is defined as the distance between the center of groove 130 and the end of fiber 112. The z-axis distance 186 is defined as the distance between the end of fiber 112 and the horizontal top surface of base 102. The forward length 480 of the fiber holder 104 is established by lapping back end 170. The angled orientation θ of the fiber holder 104 relative to the base 102 together with the forward length 480 establishes the z-axis distance 186 of the fiber 112 relative to the base 102.

Figure 4:
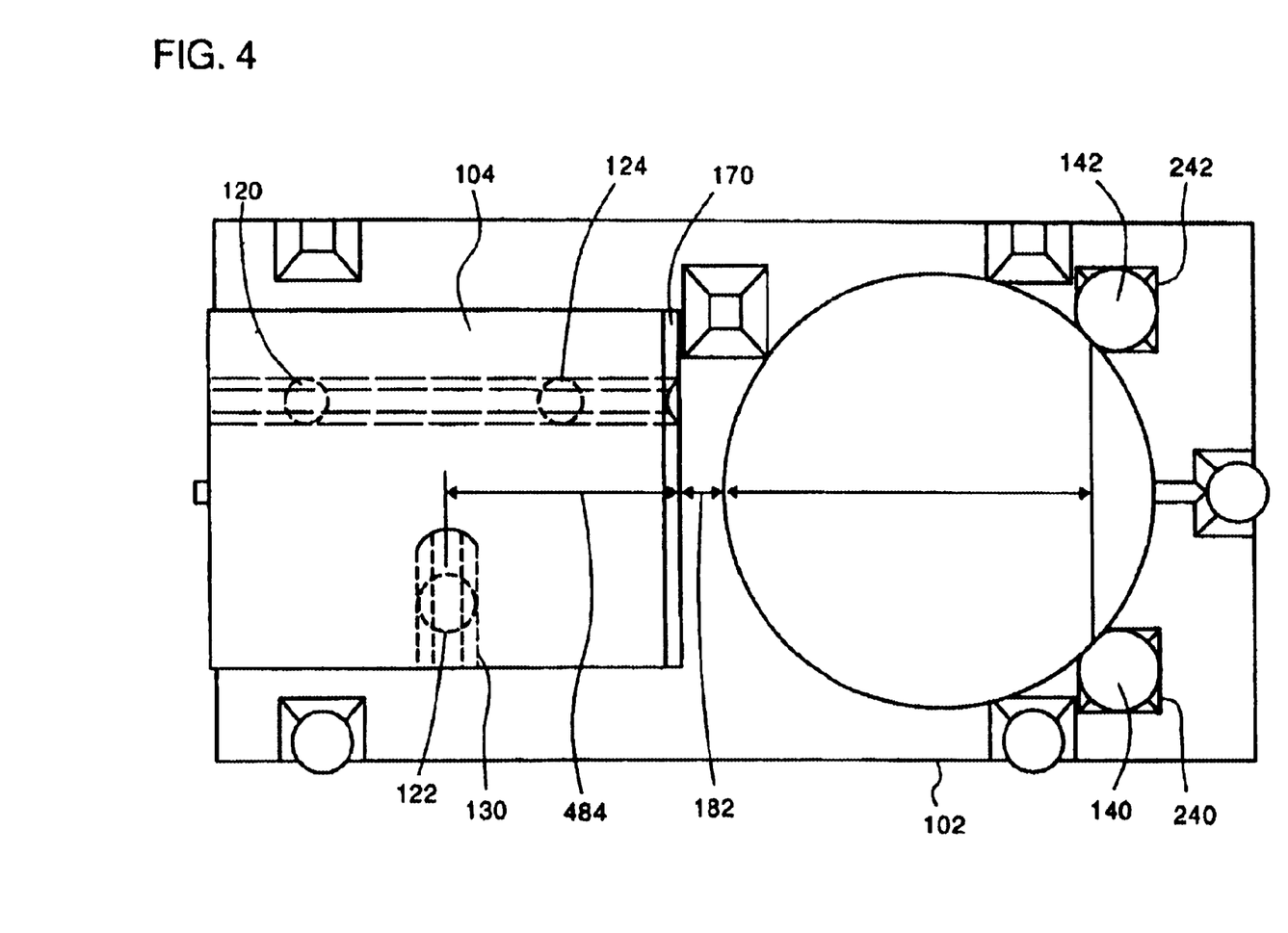
FIG. 4 shows a top view of the first embodiment.

Referring to FIGS. 1 and 4, collimating lens 106 is a dome-shaped lens with a diameter D. Lens 106 is passively aligned in the x-direction and the y-direction relative to base 102 by positioning the round central portion of the lens against alignment balls 140 and 142, which are held and glued, into the corresponding lens locator pockets 240 and 242 formed in base 102. This horizontal alignment of lens 106 relative to the base also provides a horizontal alignment of lens 106 to fiber 112 held in fiber holder 104. The positioning of lens 106 with diameter D against alignment balls 140 and 142 establishes an x-axis separation distance 182 between lens 106 and fiber 112 held in fiber holder 104.

Referring to FIGS. 1 and 3, lens 106 is passively aligned vertically, relative to the base and to end of fiber 112, by positioning the flat face of the lens 106 on top of the spacer balls 310A, 310B and 310C which are held, respectively, within the pockets 320A, 320B and 320C, formed in the base. The spacer balls 310A, 310B and 310C are sized to protrude above the surface of the base and define a plane tangent to the top of the spacer balls 310A, 310B and 310C. Spacer balls 310A, 310B and 310C, are glued into pockets 320A, 320B and 320C, respectively, and lens 106 is glued on top of spacer balls 310A, 310B and 310C, with the round central region positioned against alignment balls 140 and 142.

Alternatively, the flat face of lens 106 may be mounted directly to the top surface of base 102 without using the spacer balls 310A, 310B and 310C.

Figure 5:
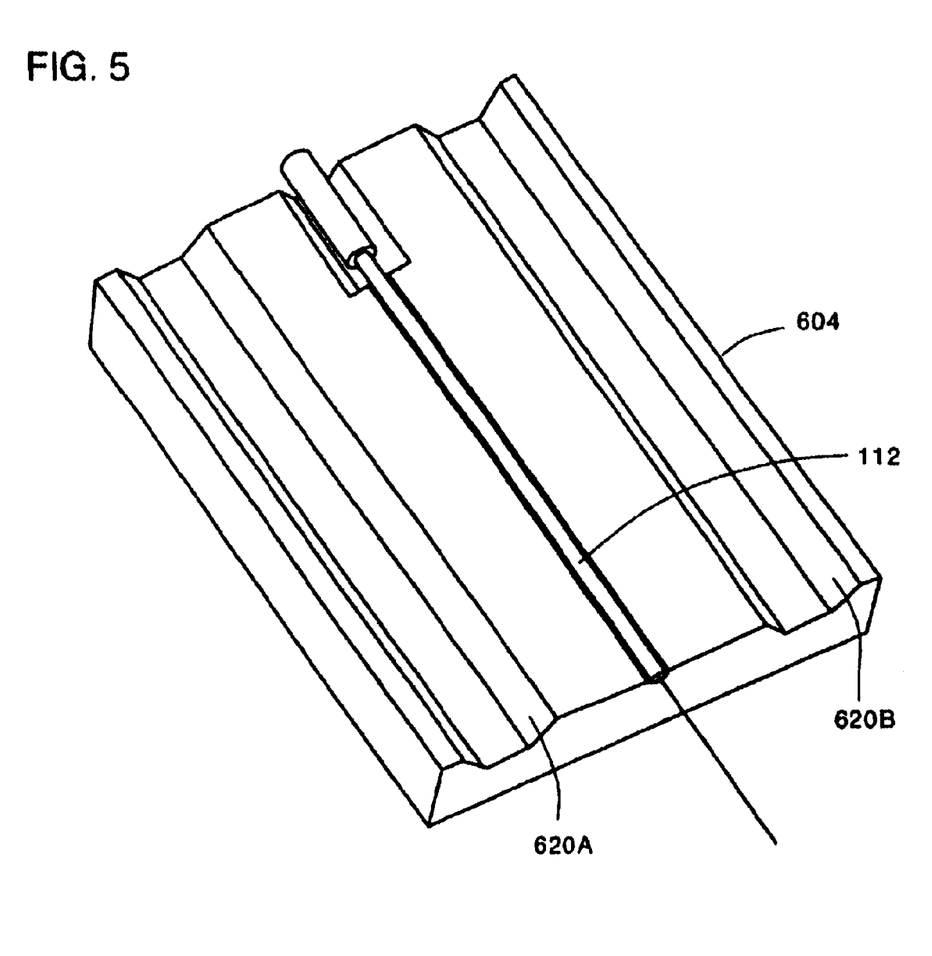
FIG. 5 shows a fiber holder of a second embodiment.
Figure 6:
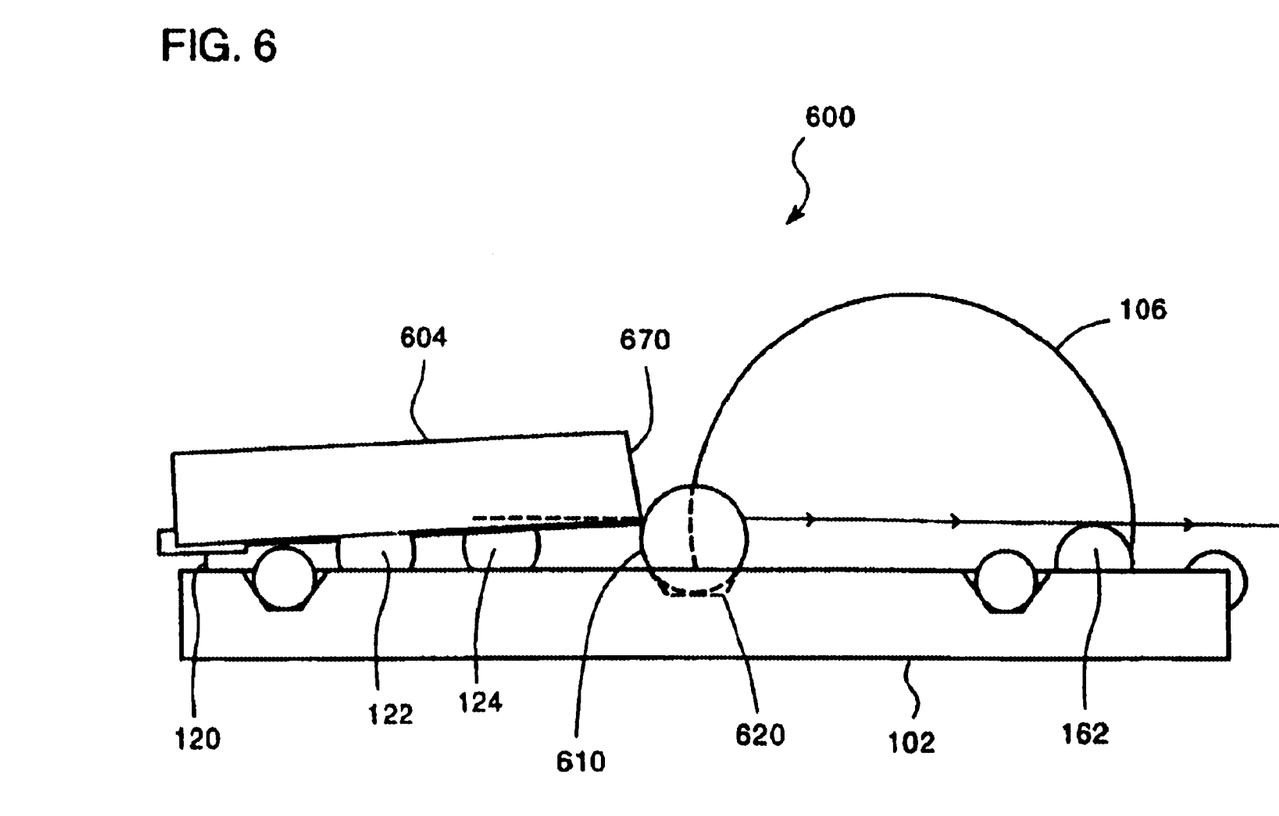
FIG. 6 shows a side view of the second embodiment.
Figure 7:
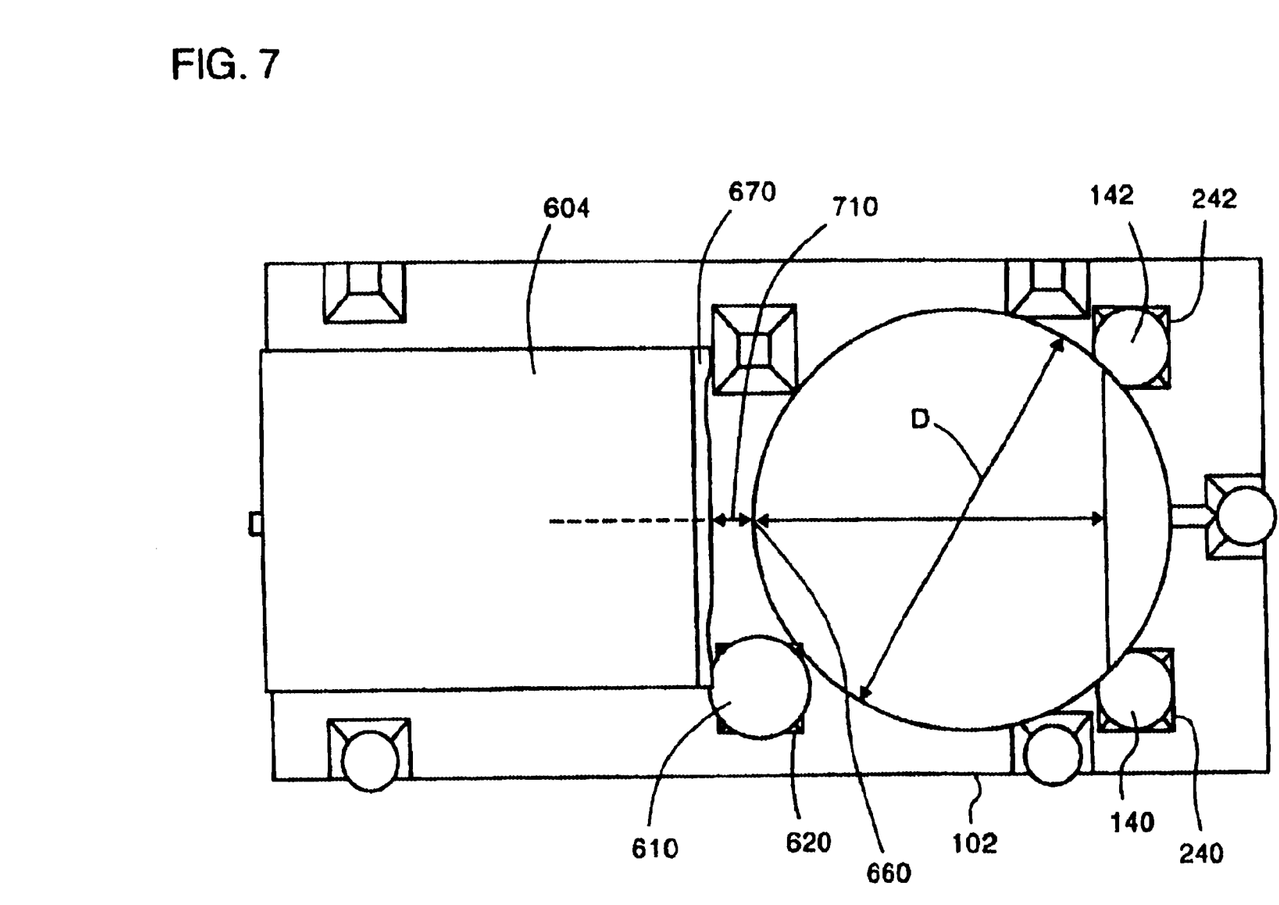
FIG. 7 shows a top view of the second embodiment.

FIGS. 5–7 show a second embodiment of an alignment apparatus 600 for passively aligning a fiber 112 to a collimating lens 106. The apparatus 600 is similar to apparatus 100 except that fiber holder 604 includes two parallel grooves 620A and 620B that are formed longitudinally from end-to-end and base 102 includes ball 610 held within a stop pocket 620 formed into base 102. To assemble the apparatus 600, spacer balls 120, 122, and 124 are placed, respectively, in pockets 420, 422, and 424 of base 102 and then fiber holder 104 is placed above base 102 so that balls 120 and 124 fit within groove 620A and ball 122 fits within groove 620B thereby positioning fiber holder 604 parallel to base 102 along the y-axis. Spacer ball 610 is placed in stop pocket 620 formed into base 102, and fiber holder end 670 is positioned to contact spacer ball 610 so that the end of fiber 112, held in fiber holder 604, is located a fixed x-axis distance 710 from lens front 660. To hold the apparatus 600 together permanently, epoxy (not shown) is put on the balls so that they will be secured within their respective grooves or pockets when the glue sets.

Figure 8:
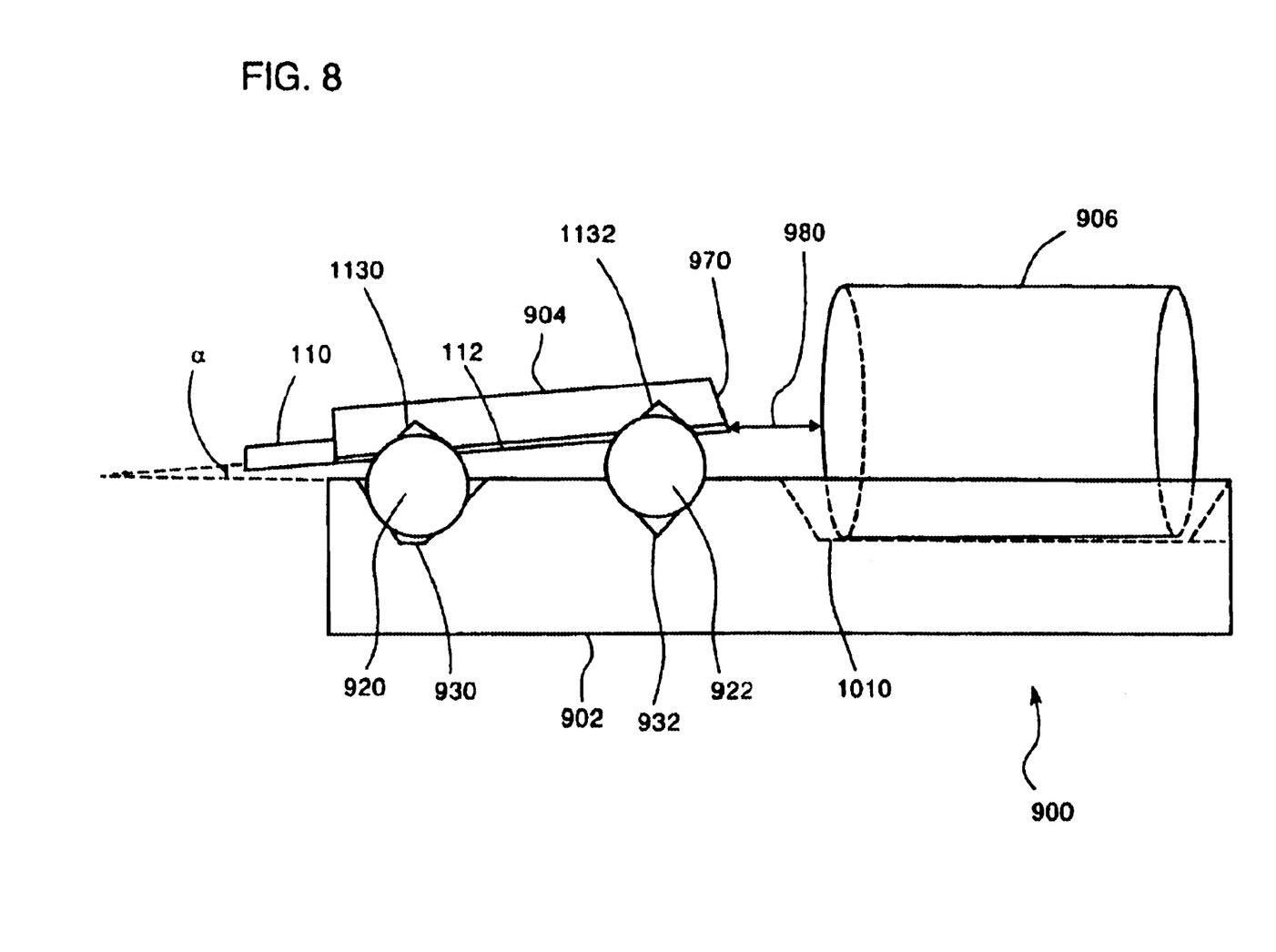
FIG. 8 shows a side view of a third embodiment.
Figure 9:
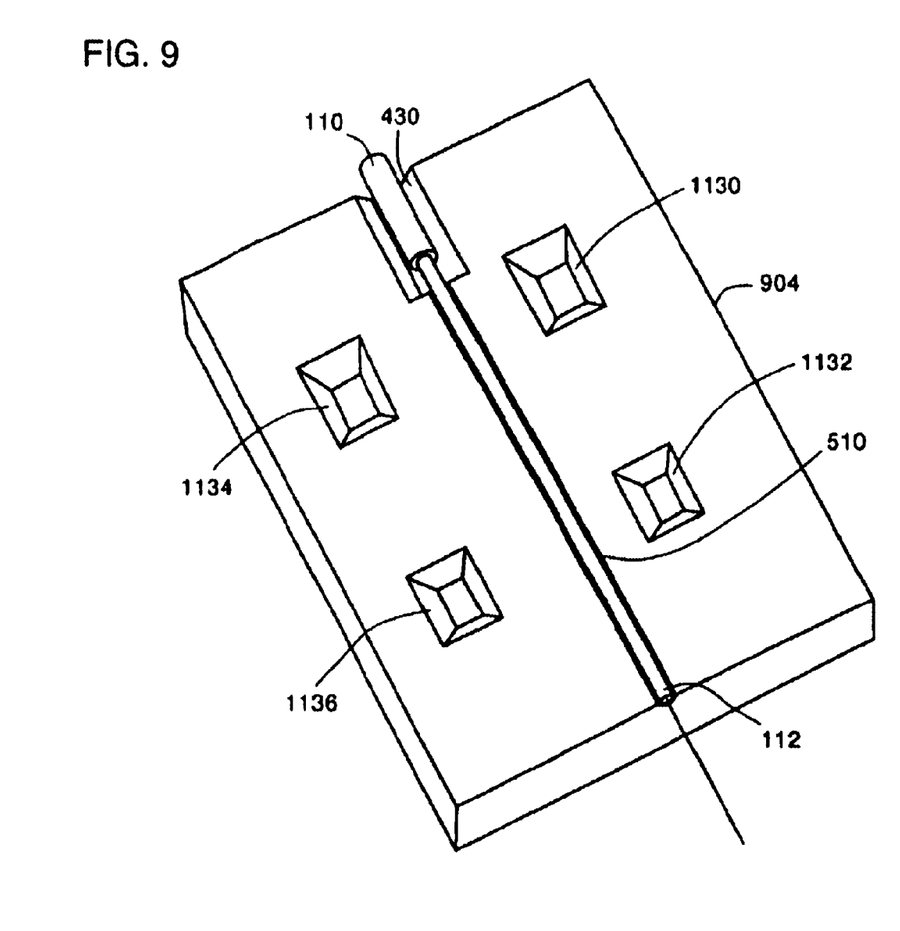
FIG. 9 shows a fiber holder of the third embodiment.
Figure 10:
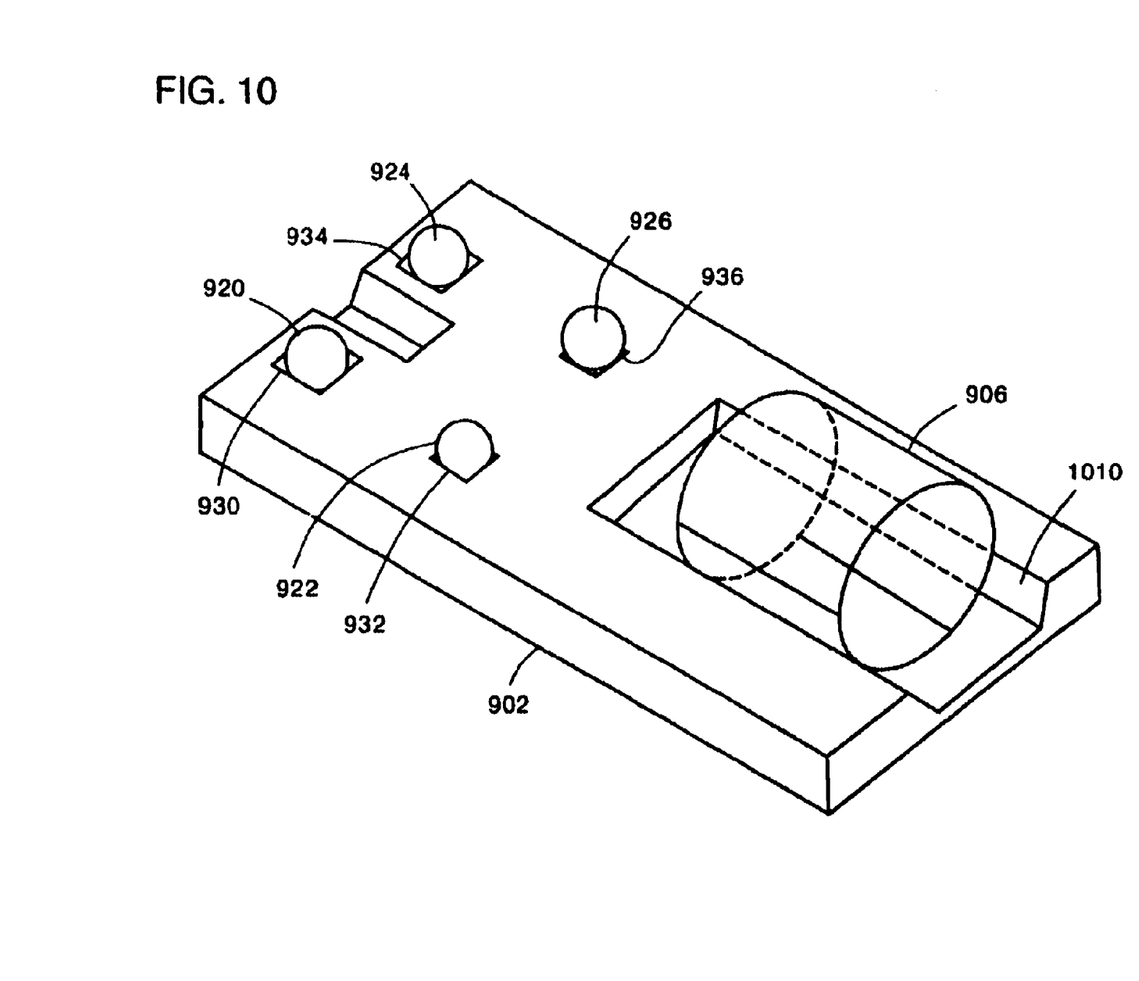
FIG. 10 shows a view of the base of the third embodiment.

FIGS. 8–10 show a third embodiment of an alignment apparatus 900 for passively aligning a fiber 112 to a collimating lens 906. The alignment features of apparatus 900 include four pockets 930, 932, 934 and 936, formed in base 902, and a corresponding set of pockets 1130, 1132, 1134 and 1136, formed in fiber holder 904. To assemble the apparatus 900, spacer balls 920, 922, 924 and 926 are placed, respectively, in pockets 930, 932, 934 and 936 of base 902 and then fiber holder 904 is placed above base 902 so that balls 920, 922, 924 and 926 fit within pockets 1130, 1132, 1134 and 1136, respectively. To hold the apparatus 900 together permanently, glue (not shown) is put on the balls so that they will be secured within their respective pockets when the glue sets. The assembled apparatus 900 locates fiber holder 904 in the x-direction and the y-direction relative to base 902 and provides a passive alignment of fiber 112 to the center of collimating lens 906, as will be explained.

In the described third embodiment, fiber holder 904 is mounted at an angle α relative to base 902 so that fiber 112 is also angled relative to the corresponding surface of collimating lens 906. That is, fiber 112 is angled off from the perpendicular to the corresponding surface of lens 106 so that any light that might be reflected back off that surface will not re-enter the fiber. The angled orientation is achieved by using balls 920, 922, 924 and 926 all having the same diameter and by forming pockets 930, 932, 934 and 936 of varying depths. More specifically, the set of pockets 930 and 934 are more shallow than the set of pockets 932 and 936. By adjusting the depths appropriately, fiber holder 904 can be made to tilt from back to front at the desired angle a in the z-direction.

In the described embodiment angle lap back angle is 3.64 degrees. However, other appropriate lap back angles could be achieved by varying the depth of pockets 930, 932, 934 and 936, or varying the size of balls 920, 922, 924 and 926, or varying the depth of pockets 1130, 1132, 1134 and 1136.

Alignment apparatus 900 includes a cylindrically-shaped collimating lens 906. Lens 906 is placed within a groove 1010 which is formed longitudinally in base 902, such that the opposing walls of groove 1010 locate lens 906 in the y-direction and the z-direction relative to base 902. Groove 1010 is etched with sufficient longitudinal length to allow lens 906 to slide in the x-direction within groove 1010 and thereby allow adjustment of an x-axis separation distance 980 between fiber 112, held in fiber holder 904, and lens 906. To assemble lens 906 to the apparatus 900, lens 906 is glued into groove 1010 using an epoxy with sufficient setting time to allow the lens to be slid within the groove until the desired x-axis separation distance 980 is achieved.

In the embodiments discussed above, the fiber holder and base elements are fabricated from a silicon wafer. The shapes of the pockets and the grooves of the fiber holder and base are formed in the silicon wafer using a lithographic process. To produce pockets and grooves with consistent and regular triangular or trapezoidal cross-sections, an 'anistropic' etching technique is used, i.e., an etching technique that removes more material in one direction than another direction. In this case, an anistropic etching technique is used that removes more material in the vertical direction than the horizontal direction relative to the edges of the etch mask on the top surface of the silicon wafer. Since the etch rates, i.e., the speed at which material is removed during etching and the shapes of the etched features are dependent on the orientation of the silicon crystalline structure, a wafer is used that has a proper crystal orientation that will produce pockets and grooves of the desired configurations.

Etching all of the features into the fiber holder or base during a single etching step over the silicon wafer offers an advantage. Any over-etching or under-etching that might occur will affect all of the etched features in the same way. In other words, pockets that are intended to be etched to different depths, will all be over-etched or under-etched in roughly equal amounts. As a consequence, over-etching or under-etching will not affect the desired tilt angle of the assembly.

Several base 102 sections are made from a single silicon wafer, with individual base 102 sections being sawn from the wafer. The sawing process typically produces base sections which are "out-of-square", i.e., the sides of each base section are not necessarily at right angles to the ends. Therefore, when an optical device is attached to base 102, such as lens 106, aligning another optical device mounted on another holder to lens 106 can be difficult since the sides and ends of base 102 may not provide a consistent reference distance to lens 106. To address this problem, another feature has been added to apparatus 100 and is described below.

Figure 11:
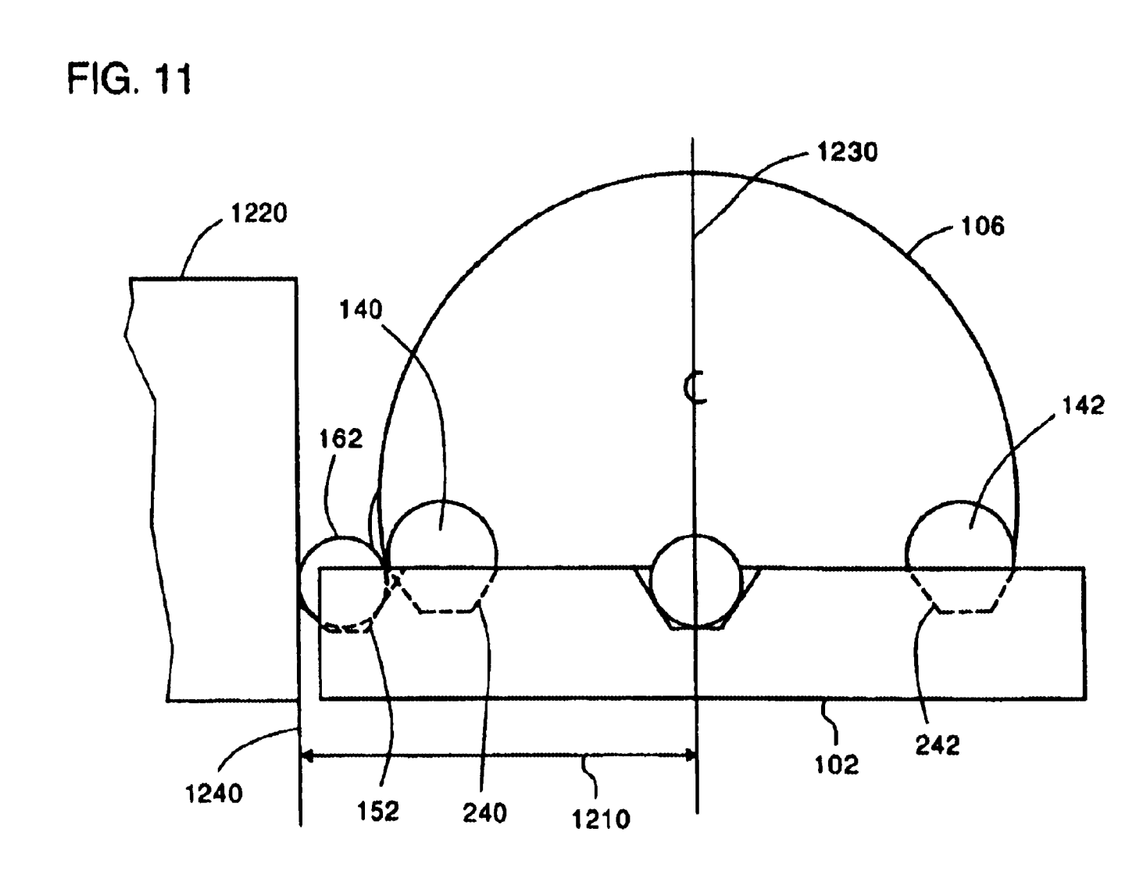
FIG. 11 shows an edge view of the first embodiment.

Referring to FIGS. 3 and 11, to align an optical device mounted external to the base to an optical device mounted on the base, exterior locator pockets 150, 152 and 264 are formed in base 102. To fabricate a base having an exterior locator pocket, a pocket is formed in a silicon wafer and individual base 102 sections are then cut from the silicon wafer so that the cut intersects the formed pocket, only a portion of the pocket in the base. By cutting less than half-way through the formed pocket to create an exterior locator pocket, a spacer ball may still be retained within the pocket, and have three contact points on the three remaining walls of the pocket. In use, spacer ball 162, with a known diameter, is placed within exterior locator pocket 152 and contacts the interior wall of exterior locator pocket 152. When lens 106 is mounted on base 102 and positioned to contact spacers 140 and 142 held in pockets 240 and 242, respectively, a horizontal separation distance 1210 is established between the center 1230 of lens 106 to a point tangent to spacer ball 162. Therefore, a second optical device, such as a lens or optical fiber, and mounted to a platform 1220 can be aligned horizontally relative to the center 1230 of lens 106 using the established separation distance 1210.

Figures 12A, 12B:
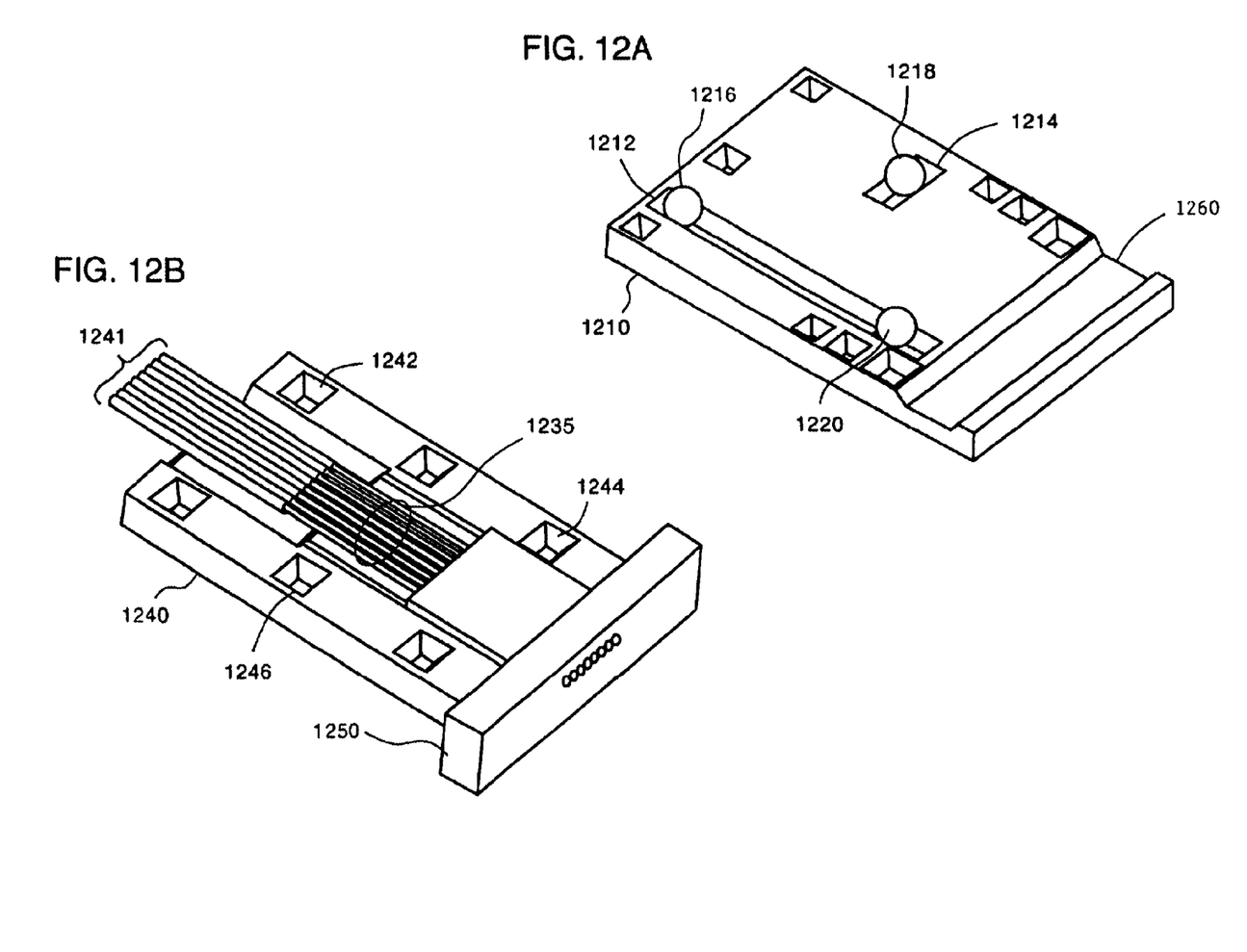
FIGS. 12A–12C shows a fourth embodiment.
Figure 12C:
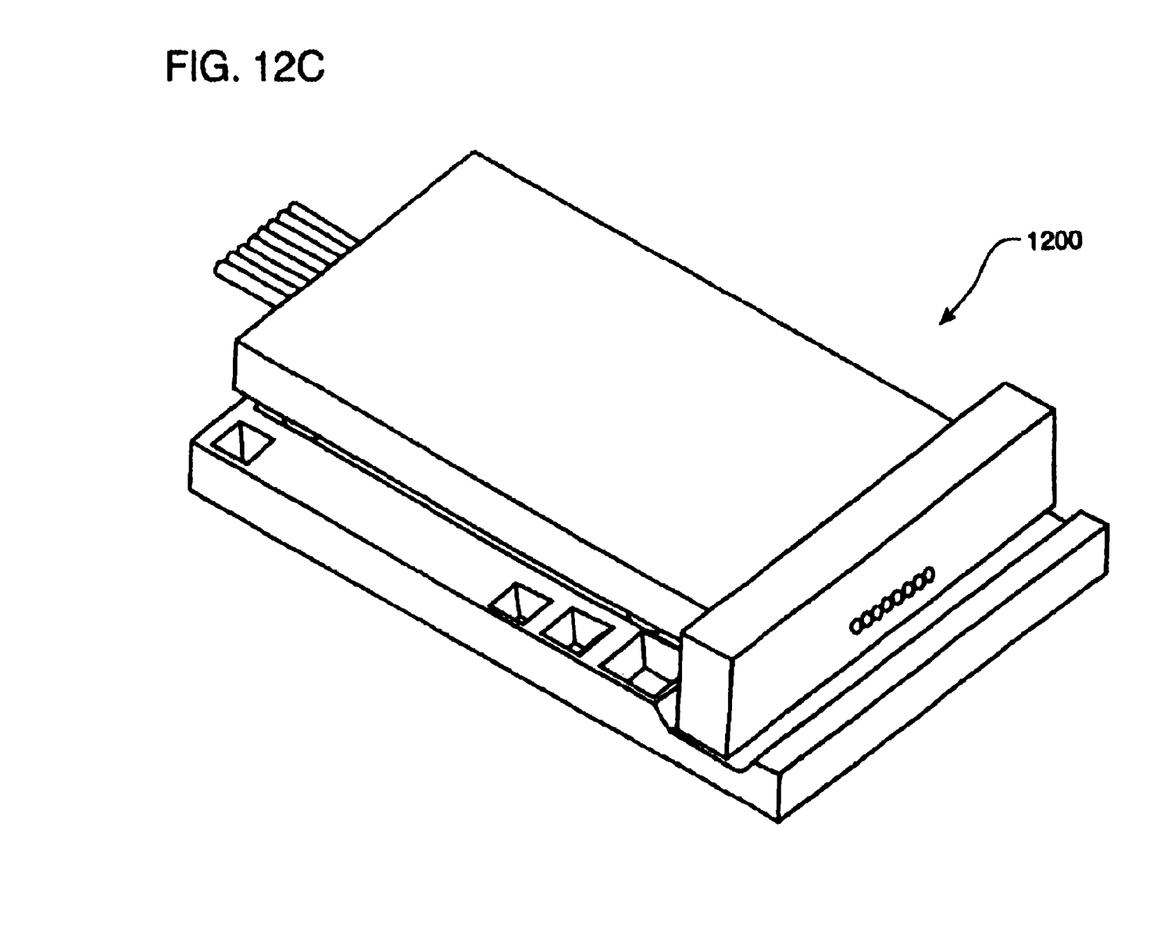

Referring to FIGS. 12A–12C, in this alternative embodiment, an apparatus 1200 (see FIG. 12C) to passively align multiple fibers to multiple optical devices, includes alignment features that are similar to those of the embodiments previously described. Apparatus 1200 includes a base 1210 that has two (2) elongated grooves 1212 and 1214 formed at right angles to each other, and three (3) spacer balls 1216, 1218 and 1220 held in grooves 1221 and 1222. Apparatus 1200 also includes a fiber holder 1240 that has a set of parallel grooves 1235 for holding a set of fibers 1241, and a set of alignment pockets 1242, 1244 and 1246, formed in a surface of fiber holder 1240. To assemble apparatus 1200, spacer balls 1216 and 1220 are placed in grooves 1212 and spacer ball 1218 is placed in groove 1214 of base 1210. Then fiber holder 1240 is placed above base 1220 so that balls 1216, 1218 and 1220 fit within pockets 1242, 1244 and 1246.

Grooves 1212 and 1214 of base 1210 are formed at right angles to each other. Therefore, when pockets 1242, 1244 and 1246 contact spacer balls 1216, 1220 and 1218, respectively, the horizontal movement of fiber holder 1240 relative to base 1210 is constrained in both the x-direction and the y-direction. To hold the apparatus 1200 together permanently, epoxy (not shown) is put on the spacer balls so that they will be secured within their respective grooves or pockets when the glue sets. Apparatus 1200 includes an optical device array 1250 that has been pre-aligned to fibers 1241 and permanently attached to an end of fiber holder 1210. Optical device array fits into elongated groove 1260 formed in base 1210 and is held in position by epoxy (not shown).

Figure 12D:
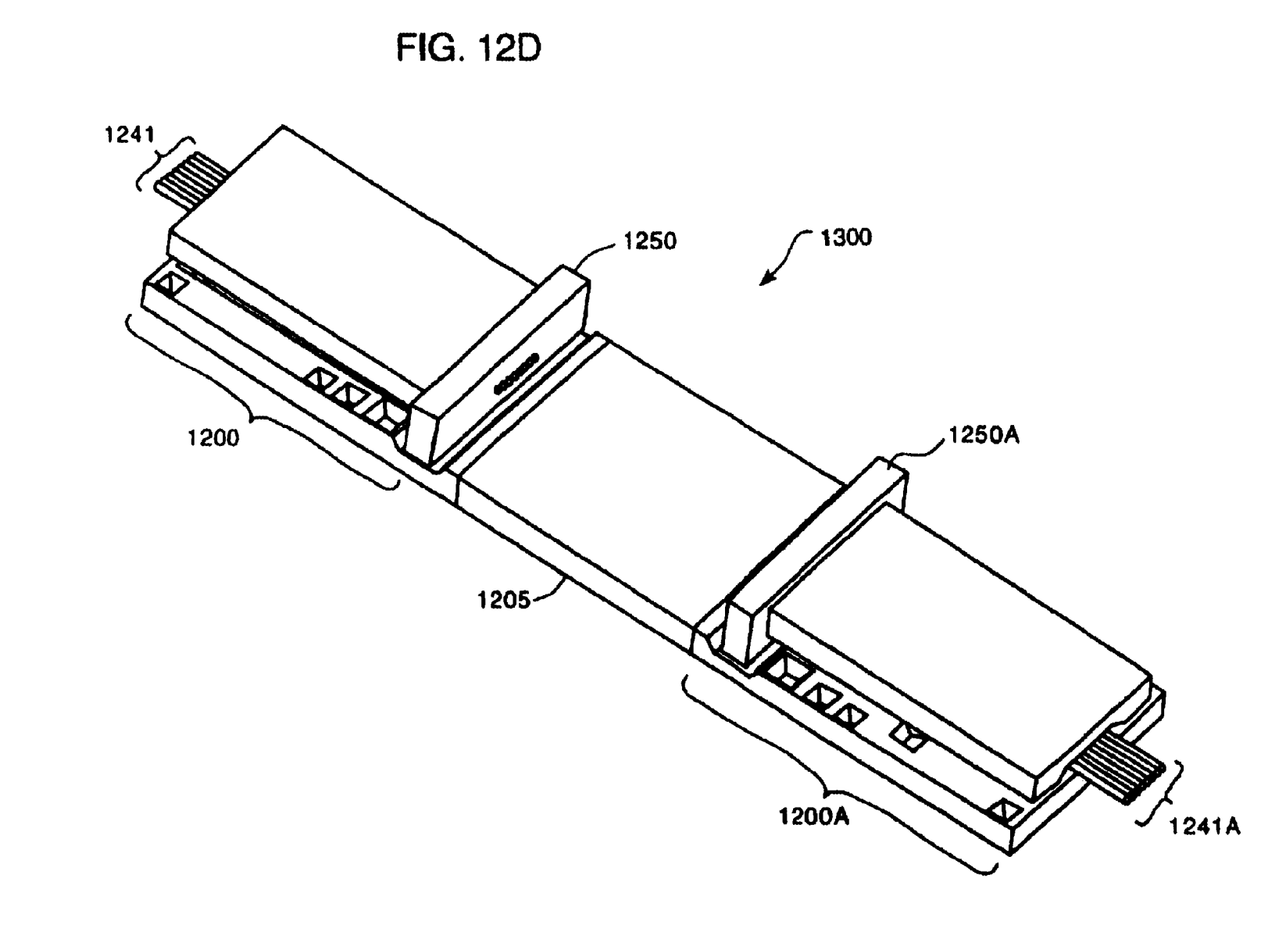
FIG. 12D shows a fifth embodiment.

Referring to FIG. 12D, apparatus 1300 includes a "double-base", that is, a base 1205 that includes a first base section 1200 (see FIG. 12B) and a second base section 1200A (see FIG. 12B) that face towards each other and align the optical devices held in array 1250 and 1250A towards each other. Therefore, if an optical device in array 1250 includes a collimating lens, for example, the output of the collimating lens will be directed towards a corresponding optical device held in array 1250A. Either array 1250 and 1250A could be modified to hold and align optical elements other than collimating lenses. For example, instead of collimating lenses, arrays 1250 and 1250A could hold other lens types such as a focusing lenses.

The spacer balls and lens described herein are typically fabricated from optical quality glass. This provides thermal compensation to the apparatus, since the expansion of the spacer balls and lenses due to temperature variations is roughly the same. In alternative embodiments, the spacer balls and lens may be fabricated from different materials.

Though we have described specific embodiments, we do not intend to imply that there are not other ways to implement some of the features of those embodiments. For example, we mentioned epoxy as the means by which various elements are attached to each other. However, any appropriate method which affixes one element to another could be used, such as fusing or soldering. In addition, the alignment grooves and pockets can be interchanged between the base and the fiber holder. Also, instead of etching the grooves and pockets to different depths to achieve the desired tilt angle, pockets and grooves of the same depth can be used with spacer balls of different diameters or any combination of the above. Also, the fiber holder and base can be fabricated with more grooves and pockets to hold more than one fiber and more than one lens. We also mentioned using a lens with a cylindrical, dome or disk shape, however, any optical device that has a cylindrical shape or at least one approximately flat face could be attached to the base member and aligned to a fiber held in the fiber holder. Instead of using spacer balls held within pockets, the spacers could be cylindrically-shaped and held within grooves formed in the base, so that contact points on the cylindrically-shaped spacers could be used to establish accurate distance relationships and allow for passive alignment of a fiber to an optical device.

A number of embodiments have been described. Nevertheless, it will be understood that various modifications may be made without departing from the spirit and scope of the invention. Accordingly, other embodiments are within the scope of the following claims.

What is claimed is:

1. An apparatus which holds an optical fiber in alignment to an optical device, said apparatus comprising:
   a fiber holder having a first plurality of indentations formed therein;
   at least one optical fiber within a corresponding one of said first plurality of indentations;
   a base substrate having a second plurality of indentations formed into said base;
   a plurality of spacers, each of said plurality of spacers within a corresponding one of the second plurality of indentations, wherein said fiber holder is mounted on said base with said plurality of spacers within said first plurality of indentations;
   an optical device mounted to said base, said optical device comprising a lens;
   a third plurality of indentations formed in said base; and
   a second plurality of spacers, each of said second plurality of spacers within a corresponding one of said third plurality of indentations, wherein said optical device is mounted to said base with an edge of said optical device in contact with at least two of said second plurality of spacers and establishes a horizontal position of said optical device.

2. The apparatus of claim 1 wherein the first plurality of indentations includes an elongated groove, and wherein said optical fiber is held within the elongated groove.

3. The apparatus of claim 1 wherein the second plurality of indentations includes at least one trapezoidal-shaped pocket.

4. The apparatus of claim 3 wherein the second plurality of indentations includes an elongated groove, and wherein said optical device comprises a lens mounted to said base within the elongated groove.

5. The apparatus of claim 1 wherein at least one of said plurality of spacers are spherically-shaped.

6. The apparatus of claim 5 wherein at least one of said plurality of spacers and said optical device are made of the same material.

7. The apparatus of claim 6 wherein the first plurality of indentations includes at least one trapezoidal-shaped pocket.

8. The apparatus of claim 1 wherein the second plurality of indentations includes at least one trapezoidal-shaped pocket.

9. The apparatus of claim 1 wherein said optical device has a round central section.

10. The apparatus of claim 1 wherein the optical device comprises one of a dome-shaped lens and a disk-shaped lens.

11. The apparatus of claim 1, wherein the at least one optical fiber comprises multiple optical fibers.

12. An apparatus which holds an optical fiber in alignment to an optical device, said apparatus comprising:
    a fiber holder having a first plurality of indentations formed therein;
    at least one optical fiber within a corresponding one of said first plurality of indentations;
    a base substrate having a second plurality of indentations formed into said base;
    a plurality of spacers, each of said plurality of spacers within a corresponding one of the second plurality of indentations, wherein said fiber holder is mounted on said base with said plurality of spacers within said first plurality of indentations;
    an optical device mounted to said base, said optical device comprising a lens and at least one flat face;
    a third plurality of indentations formed in said base; and a second plurality of spacers, each of said second plurality of spacers within a corresponding one of said third plurality of indentations, wherein said optical device is mounted to said base with said flat face in contact with at least three of said second plurality of spacers and establishes a vertical position of said optical device.

13. The apparatus of claim 12 wherein said lens is one of a dome-shaped lens and a disk-shaped lens.

14. The apparatus of claim 12, wherein the at least one optical fiber comprises multiple optical fibers.

* * * * *